United States Patent Office 3,476,643
Patented Nov. 4, 1969

3,476,643
ACRYLONITRILE POLYMER-WOOD
LAMINATED ARTICLES
Ralph E. Isley, Northfield, and Richard C. Adams,
Chardon, Ohio, assignors to The Standard Oil
Company, Cleveland, Ohio, a corporation of Ohio
No Drawing. Filed May 25, 1966, Ser. No. 552,725
Int. Cl. B32b 27/30
U.S. Cl. 161—251                                6 Claims

ABSTRACT OF THE DISCLOSURE

A laminated structure consisting of a wood base and a biaxially oriented acrylonitrile film, said film adhered to the wood base by means of an intercalated layer of an acrylonitrile-acrylate ester copolymer adhesive, is disclosed.

This invention relates to laminated structures comprising as laminae wood and certain synthetic film-forming polymers and more particularly pertains to laminated structures comprising laminae of a wood surface and an acrylonitrile polymer and to the method for their preparation.

It is an object of this invention to provide laminated structures of wood and particularly glossy surfaced laminated sheet structures which have excellent resistance to the natural elements such as air, light and heat and are able to maintain their original appearance for long periods of time under both normal and adverse natural conditions. Another object is the provision of laminated structures which are strong, tough and chemically resistant and maintain their initial appearance even under adverse conditions for long periods of time with little or no alteration.

That the foregoing and other objects have been accomplished by this invention wil become apparent from the following description and illustrative examples.

The laminated structures of this invention are composed primarily of at least one surface of a wood article adhered to at least one surface of an acrylonitrile polymer. The foregoing surfaces of said wood and said acrylonitrile polymer may be continuous or discontinuous as illustrated by a smooth film surface on the one hand and the rough surface of an unfinished natural wood on the other. Preferably, the laminated structures comprise at least one surface of a wood adhered to at least one surface of an acrylonitrile polymer film by means of an acrylonitrile copolymer adhesive. The acrylonitrile polymer films embodied in this invention are from about 0.1 mil to 15 mi!s in thickness and preferably from about 0.25 to 10 mils in thickness. The acrylonitrile polymer film is adhered to the wood surface in accordance with this invention by means of an intercalated layer of an acrylonitrile-acrylate ester copolymer which serves as an adhesive.

Surprisingly, the laminated structures of this invention present a surface which is glossy, has a pleasant appearance exhibiting the natural grains of the underlying wood surface and retains the original pleasant appearance even upon prolonged exposure to the natural elements such as wind, sunlight, heat, air, rain, hail, frost, ice, snow, etc. The laminated structures of this invention can be used for long periods of time out-of-doors without the necessity for periodic cleaning, scraping, painting, etc., as is usual for most wood and allied surfaces.

The woods and wood surfaces useful in the laminated articles and process of this invention include, but are not limited to, natural woods such as pine, birch, oak, maple, redwood, cedar, cherry, mahogany, teak, walnut, and various combinations of the foregoing, and the like and others. Plywood, inlaid woods, other wood laminates having a natural wood surface or modified natural wood surface, natural and synthetic resins therein are also included but less preferred in this invention.

The acrylonitrile polymer films useful in the present invention are those composed of resinous polymers containing at least about 90% by weight of polymerized acrylonitrile and preferably those containing at least 95% by weight of polymerized acrylonitrile with the remainder being a polymerized vinyl monomer which is copolymerizable with acrylonitrile. The vinyl monomers which comprise the additional 5 to 10% of the acrylonitrile polymer may be monoalkenyl or polyalkenyl monomers or a combination of both. Most preferred as films in the present invention are acrylonitrile homopolymers and copolymers prepared with up to about 5% by weight of at least one polyalkenyl monomer.

The polyalkenyl monomers useful in the acrylonitrile polymer films of this invention include those having at least two polymerizable olefinic groups per molecule. Such monomers include allyl arcylate, allyl methacrylate, diallyl maleate, diallyl fumarate, ethylene glycol dimaleate, dialyl itaconate, methallyl acrylate, tetramethylene diacrylate, divinyl ether, the divinyl ethers of butanediol-1,4, diallyl ether, dimethallyl ether, ethylene glycol dimethacrylate, 1,1,1-trimethoxy - propanedimethacrylate, glyceryl triacrylate, sucrose hexaacrylate, diallyl phthalate, triallyl cyanurate, 2,2,5,5-tetramethyl-1,5-hexadiene, 1,5-hexadiene, 1,6-heptadiene, 1,7-octadiene, 1,8-nonadiene, divinyl biphenyl, divinyl naphthalene, divinyl benzene, trivinyl benzene, diallyl benzene, diisopropenyl benzene, allyl allyloxyacetate, ethylidene dimethacrylate, methylene dimethacrylate, diallyl melamine, diallyl isomelamine, triallyl melamine, triallyl aconitate, triallyl phosphate, tetraalyl silane, tetravinyl silane, diallyl divinyl siane, tetraallyl germane, tetravinyl tin, tetravinyl germane, triacryloyl perhydrotriazine, trimethacryloyl perhydrotriazine, divinyl spirobi, methylene-bis-acrylamide, ethylene diacrylamide, N-allyl acrylamide, N,N-diallyl acrylamide, N,N-dimethallyl methacrylamide, polyally ethers of polyhydric alcohols such as tetra-allyl pentaerythritol, hexaallyl sucrose, hexaallyl inositol, hexaallyl sorbitol, hexavinyl sucrose, and the like.

Monoalkenyl monomers useful in the acrylonitrile polymer films of this invention include the acrylate esters such as methyl acrylate, ethyl acrylate, the propyl acrylates, the butyl acrylates, the amyl acrylates, the hexyl acrylates, cyclohexyl acrylate, phenyl acrylate, the octyl acrylates and the like; the methacrylate esters such as methyl methacrylate, ethyl methacrylate, the propyl methacrylates, the butyl methacrylates, the amyl methacrylates, the hexyl methacrylates, cyclohexyl methacrylate, phenyl methacrylate, the decyl methacrylates and the like; vinyl esters such as vinyl acetate, vinyl propionate, the vinyl butyrates, vinyl benzoate, isopropenyl acetate, an the like; the vinyl aromatics such as styrene, alpha-methyl styrene, vinyl toluene, the vinyl xylenes, the vinyl naphthalenes, isopropenyl benzene, and the like; vinyl amides such as acrylamide, methacrylamide, N-methyl acrylamide, vinyl benzamide, N-vinyl pyrrolidone, and the like; the vinyl halides such as vinyl chloride, vinyl bromide, vinyl fluoride, vinylidene chloride, vinylidene fluoride, dichloro-difluoro ethylene, tetrafluoroethylene, and the like; olefins such as ethylene, propylene, isobutylene, butene-1 and the like.

The acrylonitrile copolymers useful as adhesives in the acrylonitrile polymer film-wood laminates of the present invention broadly include copolymers of from 60 to 80% by weight of an alpha, beta-olefinically unsaturated nitrile and from 40 to 20% by weight of an alpha, beta-olefinically unsaturated carboxylic acid ester. The alpha, beta-olefinically unsaturated nitriles include acrylonitrile and methacrylonitrile and the alpha, beta-olefinically unsaturated carboxylic acid esters include acrylic esters, methacrylic esters, maleic esters, crotonic esters, itaconate esters and the like. The preferred acrylonitrile copolymer adhesives include copolymers of acrylonitrile and at least one acrylic acid ester having the structure $$CH_2=CHCOOR$$

wherein R is a hydrocarbon group having from 1 to 10 carbon atoms and more preferably wherein R is an alkyl group having from 1 to 6 carbon atoms.

The acrylonitrile polymers and copolymers embodied herein can be prepared by carrying out substantially complete (70%–100%) conversion of monomer to polymer in any convenient manner such as by batch, bulk, solution, emulsion or suspension polymerization techniques, all of which are known in the art. The preferred film and other shaped forms of the acrylonitrile polymers useful in the laminates of this invention are preferably oriented and more preferably biaxially oriented by means more fully described and claimed in the copending U.S. patent application of R. E. Isley, R. C. Adams and L. E. Ball, Ser. No. 377,041, filed June 22, 1964, and the copending U.S. patent application of L. E. Ball, Ser. No. 421,612, filed Dec. 28, 1964, now U.S. Patent No. 3,418,406, both of which are incorporated herein by this reference. The acrylonitrile copolymer adhesives preferred in the practice of this invention can be prepared by procedures given in U.S. Patent No. 2,412,034.

If desirable, minor amounts of lubricants, dyes, bleaching agents, pigments, colors, reinforcing agents and stabilizers of various types may be incorporated into the acrylonitrile polymer films and/or the acrylonitrile copolymer adhesives of the present invention.

The laminated structures embodied herein may be prepared by one or more of several conventional procedures. In one procedure, the wood surface and the acrylonitrile polymer surface are brought together and adhered to one another by means of the acrylonitrile copolymer adhesive. The surface of either or both of the laminae may also be treated in some manner to make them more adherent.

alone or in conjunction with one or more other materials are also particularly adaptable for the construction of wall panels, building exteriors, display signs, containers such as boxes, and the like.

The laminated products of this invention are further illustrated in the following examples wherein the amounts of ingredients are expressed in parts by weight unless otherwise indicated.

EXAMPLE I

A film of biaxially oriented polyacrylonitrile was prepared according to copending U.S. patent application Ser. No. 377,041. Samples A, B, C, D, E, F and G (see table) employed pressure-sensitive adhesives. The samples were in solutions and were coated on the films and dried. The coated films were then pressed against a paperboard coated with a release coating and could be removed from the paperboard when needed for use. All of the adhesives were in solvents except for C which was in latex form.

The wood was coated by simply pressing the pressure-sensitive adhesive side of the film against the surface of the wood. Some overlap was necessary around the edges. The entire block of the 2½" x 4" piece of wood was covered by the film.

Sample H (which is the only sample falling within the scope of this invention) employed a thin sheet of 70/30 acrylonitrile/ethyl acrylate copolymer as adhesive. The 70/30 acrylonitrile/ethyl acrylate copolymer was prepared according to Example 4 of U.S. Patent No. 2,412,034 employing 70 parts by weight of acrylonitrile, 30 parts by weight of ethyl acrylate, 150 parts by weight of water, 3 parts by weight of an emulsifier, 0.3 part by weight of a polymerization initiator and 0.5 part by weight of a chain transfer agent. This sample was prepared by pressing together the three layers of (a) polyacrylonitrile film (1.2 mils), (b) 70/30 acrylonitrile/ethyl acrylate (13 mils) and (c) pine plywood (⅜") at 340° F. and 3,000 p.s.i..

In each of these samples only one side of the sample was coated and exposed; the other side and edges were painted with a marine varnish.

TABLE

| | | | Effect after 6 Months Exposure | |
|---|---|---|---|---|
| | Film | Adhesive | Florida | Arizona |
| Sample: | | | | |
| A | PAN (0.5 mil) | Commercial stabilized polyvinyl ethyl ether. | Wood dark; some film delamination | Wood dark; edges of film delaminated. |
| B | PAN (1.2 mil) | Lab prepared unstabilized polyvinyl ethyl ether. | Severe film delamination | Wood dark; 75% film delamination. |
| C | do | Commercial copolymer of ethyl acrylate and acrylic acid. | Wood dark; some delamination | Some fungus and film delamination; light color. |
| D | do | Commercial polyvinyl acetate | | Dark; no delamination. |
| E | do | do | Severe darkening and fading | Severe mildew due to delamination of film. |
| F | do | Polyvinyl ethyl ether | Pronounced fading of wood; no delamination. | Do. |
| G | Mylar (2.0 mil) | Stabilized polyvinyl ethyl ether | Wood dark and fading; wood cracked | Film brittle, cracked; severe mildew. |
| H | PAN (1.2 mil) | 70/30 acrylonitrile/ethyl acrylate copolymer. | No defects | No defects. |

In Florida the exposure was equivalent to 79,190 Langleys with 46.3 inches of rain; and in Arizona the exposure was equivalent to 79,201 Langleys with 4.18 inches of rain. A Langley by definition is one gram calorie per square centimeter.

For instance, the acrylonitrile polymer surface can be made much more adherent by treatment with a gaseous mixture of boron trifluoride and an oxidizing agent as described in British Patent No. 834,196. The surface of the acrylonitrile polymer film can also be flame-treated, treated by corona discharge as disclosed in U.S. Patents Nos. 2,632,921; 2,648,097 and 3,018,189; and in British Patent No. 986,680; or treated with a strong oxidant such as nitric acid to make them more adherent.

The adhesive layer can be applied to one or more surfaces of the laminae by means of a solvent or liquid dispersion followed by evaporation of the liquid phase.

According to another process for preparing the laminates, the adhesive can be readily sandwiched between the laminae embodied in this invention by means of a rolling mechanism and heat can be applied through the rolls or by other means.

The laminated products of this invention, either used

EXAMPLE II

Results similar to those given in Example I were obtained when a biaxially oriented acrylonitrile homopolymer, prepared according to copending U.S. patent application Ser. No. 421,612, now U.S. Patent 3,418,406, was used in place of the biaxially oriented polyacrylonitrile film described in Example I.

EXAMPLE III

Results similar to those given in Example I were obtained when an adhesive composed of 70/30 acrylonitrile/methyl acrylate was substituted for the adhesive of Sample H.

EXAMPLE IV

Results similar to those given in Example I were obtained when an adhesive composed of 80/20 acrylonitrile/ethyl acrylate was substituted for the adhesive of Sample H.

We claim:
1. A laminated article comprising at least one surface of wood adhered to at least one surface of a biaxially oriented polymer film consisting essentially of a polymer of at least 90% by weight of polymerized acrylonitrile and up to 10% by weight of a polymerized vinyl monomer which is copolymerizable with acrylonitrile by means of an intercalated layer of an adhesive consisting essentially of a copolymer prepared by the copolymerization of from 60 to 80% by weight of acrylonitrile and from 40 to 20% by weight of an acrylic acid ester having the structure $CH_2=CHCOOR$ wherein R is a hydrocarbon group containing from 1 to 10 carbon atoms.
2. The article of claim 1 wherein the polymer film consists essentially of a polymer of at least 95% by weight of polymerized acrylonitrile.
3. The article of claim 1 wherein the polymer film is a homopolymer of acrylonitrile.
4. The article of claim 3 wherein the adhesive is prepared by copolymerization of 70 parts by weight of acrylonitrile and 30 parts by weight of ethyl acrylate.
5. The article of claim 3 wherein the adhesive is prepared by copolymerization of 70 parts by weight of acrylonitrile and 30 parts by weight of methyl acrylate.
6. The article of claim 3 wherein the adhesive is prepared by copolymerization of 80 parts by weight of acrylonitrile and 20 parts by weight of ethyl acrylate.

References Cited
UNITED STATES PATENTS

| | | | |
|---|---|---|---|
| 2,412,034 | 12/1946 | D'Alelio | 260—85.5 X |
| 2,776,946 | 1/1957 | Lytton et al. | 161—251 |
| 2,784,135 | 3/1957 | Woodling et al. | 161—251 |
| 2,879,547 | 3/1959 | Morris | 161—254 |
| 3,275,612 | 9/1966 | Bechtold | 161—251 |

ROBERT F. BURNETT, Primary Examiner

LINDA M. CARLIN, Assistant Examiner

U.S. Cl. X.R.

260—85.5; 156—331; 161—402